United States Patent [19]
Allen et al.

[11] Patent Number: 4,927,097
[45] Date of Patent: May 22, 1990

[54] CAGING SYSTEM

[75] Inventors: Terry S. Allen, Phoenix; Patrick J. Wolke, Glendale, both of Ariz.

[73] Assignee: Honeywell Inc., Minneapolis, Minn.

[21] Appl. No.: 237,207

[22] Filed: Aug. 29, 1988

[51] Int. Cl.⁵ .............................................. B64D 47/00
[52] U.S. Cl. .................................................. 244/118.1
[58] Field of Search ............................ 74/56, 57, 625; 244/118.1; 269/233

[56] References Cited
U.S. PATENT DOCUMENTS

| | | | |
|---|---|---|---|
| 4,088,018 | 5/1978 | Anderson et al. | 244/118.1 |
| 4,108,424 | 8/1978 | Rizzo | 267/166 |
| 4,322,984 | 4/1982 | Lasker et al. | 74/5.1 |
| 4,483,207 | 11/1984 | Harrington | 74/5.1 |

Primary Examiner—Sherman D. Basinger
Assistant Examiner—Anne Sartelle
Attorney, Agent, or Firm—Howard Paul Terry

[57] ABSTRACT

A caging system is used in a magnetic platform which is mounted on a pointing system on a spacecraft. The magnetic platform supports a payload, and provides a frictionless support in all conditions. The caging system clamps the payload in a caged condition and provides a frictionless support in an uncaged condition. The caging system includes a plurality of caging actuators. Each caging actuator has an upper support structure which connects to a snubber member, and has a lower support structure which connects to a first ring and to a coaxial second ring for clamping the snubber member. A cylindrical cam member has a plurality of groove surfaces and the first and second rings respectively have a plurality of cam followers. Clockwise rotation of the cam member urges the rings together. Counterclockwise rotation urges the rings apart. A second, auxiliary caging actuator is provided. The second caging actuator is disposed radially inwardly of the first caging actuator, and includes third and fourth rings for clamping the snubber member. Manually operated gear means, and a backup motor, are provided for operating the third and fourth rings.

14 Claims, 8 Drawing Sheets

CAGING SYSTEM

This invention was made with U.S. Government support and the U.S. Government has certain rights therein.

The invention generally relates to a caging system, and in particular the invention relates to a caging system for a payload support platform on a spacecraft.

BACKGROUND OF THE INVENTION

The prior art caging system for an equipment platform includes a plurality of rotary clamp assemblies, one for each gimbal of the platform.

One problem with the prior art caging system is that there is a substantial friction in each clamp assembly in its uncaged condition.

SUMMARY OF THE INVENTION

According to the present invention, a caging system is provided for an equipment platform on a spacecraft. The caging system includes at least three axial caging actuators, each actuator having a first portion with a snubber having an axis, and having a second portion with a pair of axially spaced caging rings disposed on axially opposite sides of the snubber, the caging rings being axially movable away from the snubber in the uncaged condition of the actuator.

By using the structure of the snubber and the pair of axially movable caging rings, the caging actuator avoids friction in the uncaged condition of the actuator, whereby the problem of friction in the caging system in its uncaged condition is avoided.

The foregoing and other objects, features and advantages will be apparent from the following description of the preferred embodiment of the invention as illustrated in the accompanying drawings.

DESCRIPTION OF THE PREFERRED EMBODIMENT

Figure 1:
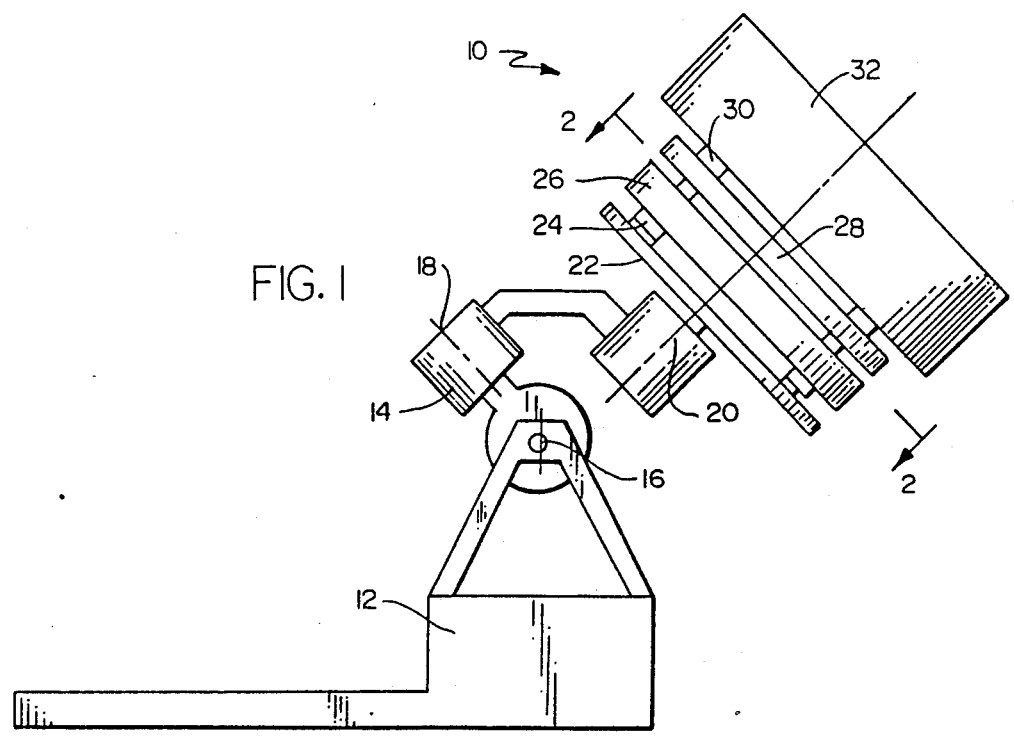
FIG. 1 is a schematic side elevation view of a payload support system according to the invention.

As shown in FIG. 1, a payload support system 10 is provided. System 10 includes a pointing structure 14, a suspension and caging platform 26 and a payload unit 32. FIG. 1 is a schematic drawing.

Pointing structure 14 is mounted on a spacecraft 12 and is movable about three axes 16, 18, 20, which are three axes in quadrature. Pointing structure 14 has a plate 22 with a plurality of flanges 24, which connect to suspension and caging platform 26 for angularly displacing platform 26 about each of the axes 16, 18, 20.

Payload unit 32 has a support member 28 which connects to platform 26. Payload unit 32 also has flanges 30, which connect to support member 28. Platform 26 provides a magnetic support or a magnetic bed for supporting payload unit 32 in the uncaged condition.

Figure 3:
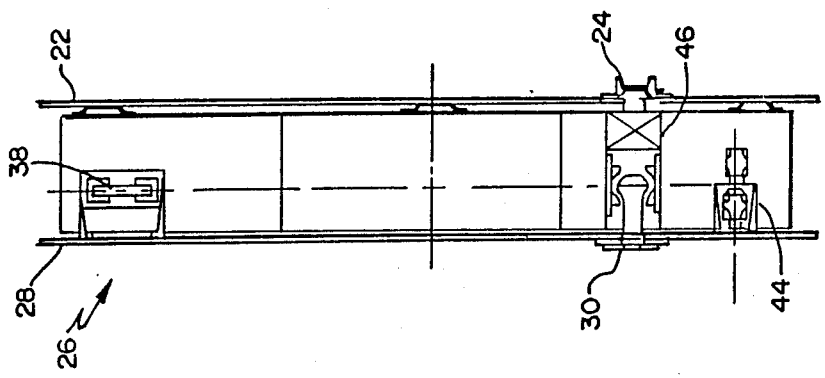
FIG. 3 is a section view as taken along line 3—3 of FIG. 2.
Figure 2:
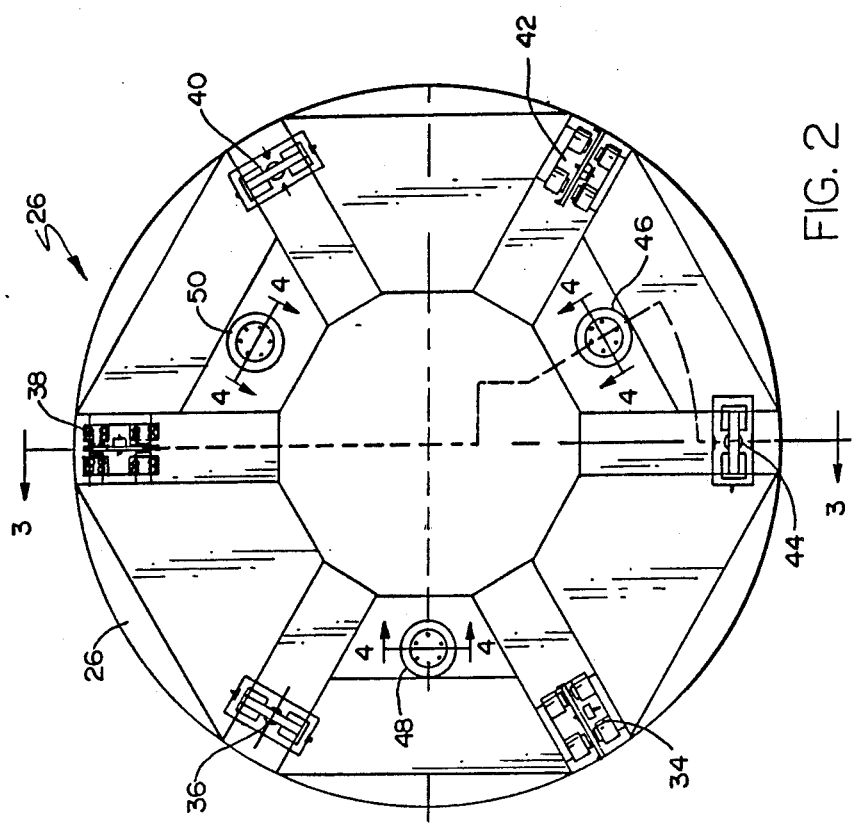
FIG. 2 is a section view as taken along line 2—2 of FIG. 1.

As shown in FIGS. 2 and 3, suspension and caging platform 26 has first, second, third, fourth, fifth and sixth magnetic actuators 34, 36, 38, 40, 42, 44, which are spaced apart at equal angles. Suspension and caging unit 26 also has first, second and third caging actuators 46, 48, 50, which are spaced apart at equal angles. Caging actuators 46, 48, 50, which are identical in construction, are able to clamp or lock pointing structure 14 to payload unit 32 in their caged condition. In their uncaged condition, caging actuators 46, 48, 50 have no mechanical connection of pointing structure 14 to payload unit 32, so that there is no friction force on payload unit 32.

As shown in FIGS. 2 and 3, magnetic actuators 34, 36, 38, 40, 42, 44, which are conventional magnetic actuators, are able to suspend or float the support member 28 relative to the plate member 22.

Figure 5:
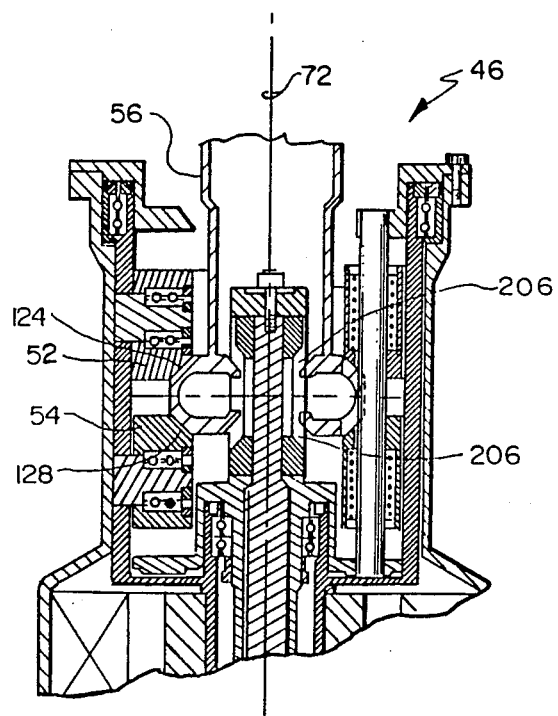
FIG. 5 is a section view corresponding to a portion of FIG. 4.
Figure 4:
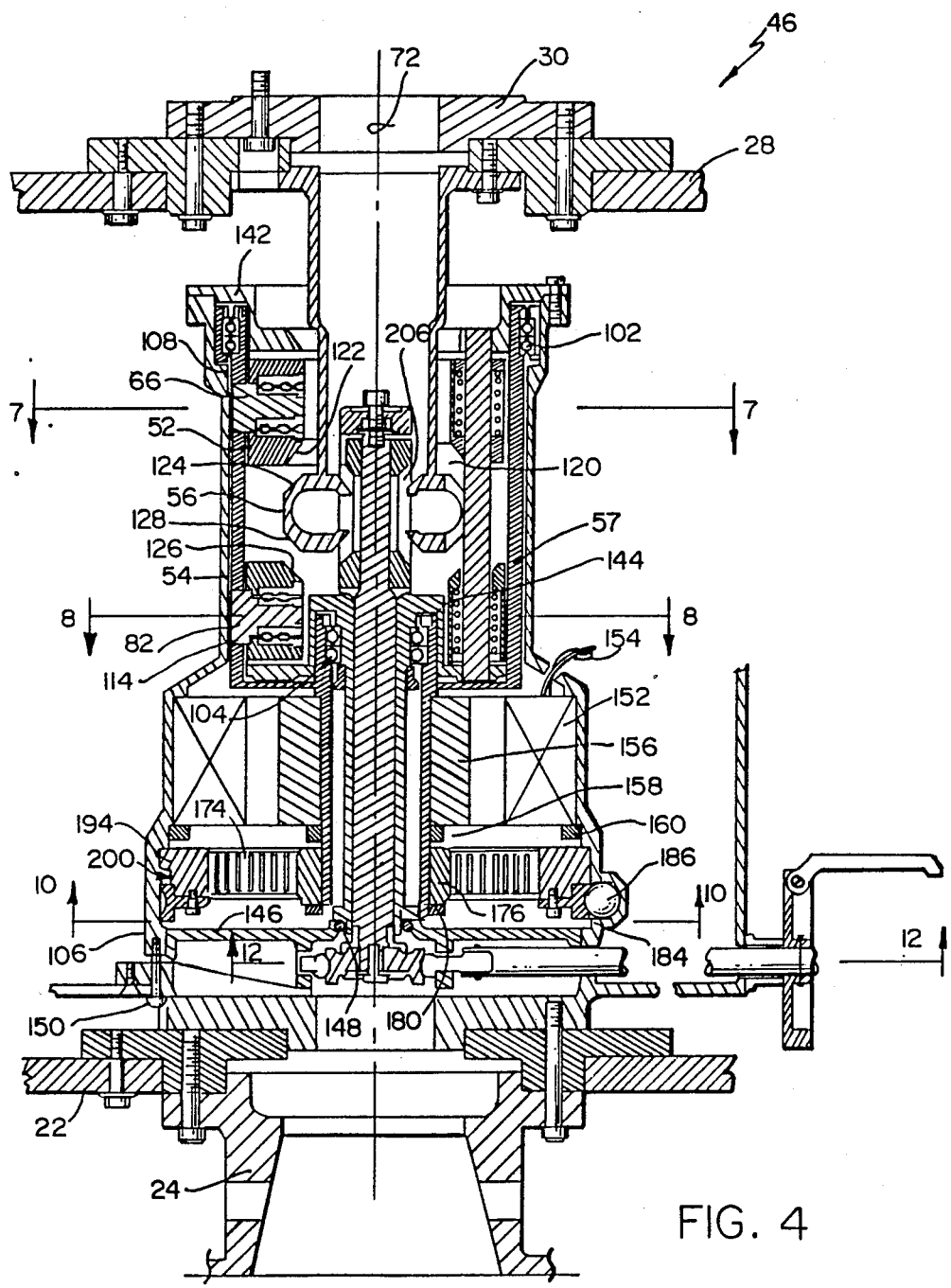
FIG. 4 is a section view as taken along line 4—4 of FIG. 2.

As shown in FIGS. 4 and 5, caging actuator 46 which is a typical actuator, includes an upper caging ring 52, a lower caging ring 54, a snubber 56, and a rotary cam 57. Cam 57 is angularly displaceable for urging rings 52 and 54 against snubber 56 in the caged condition for locking payload unit 32 to pointing structure 14. When rings 52 and 54 are moved away from snubber 56 in the uncaged condition, there is no contact therebetween, thereby avoiding any friction therebetween.

Figure 6:
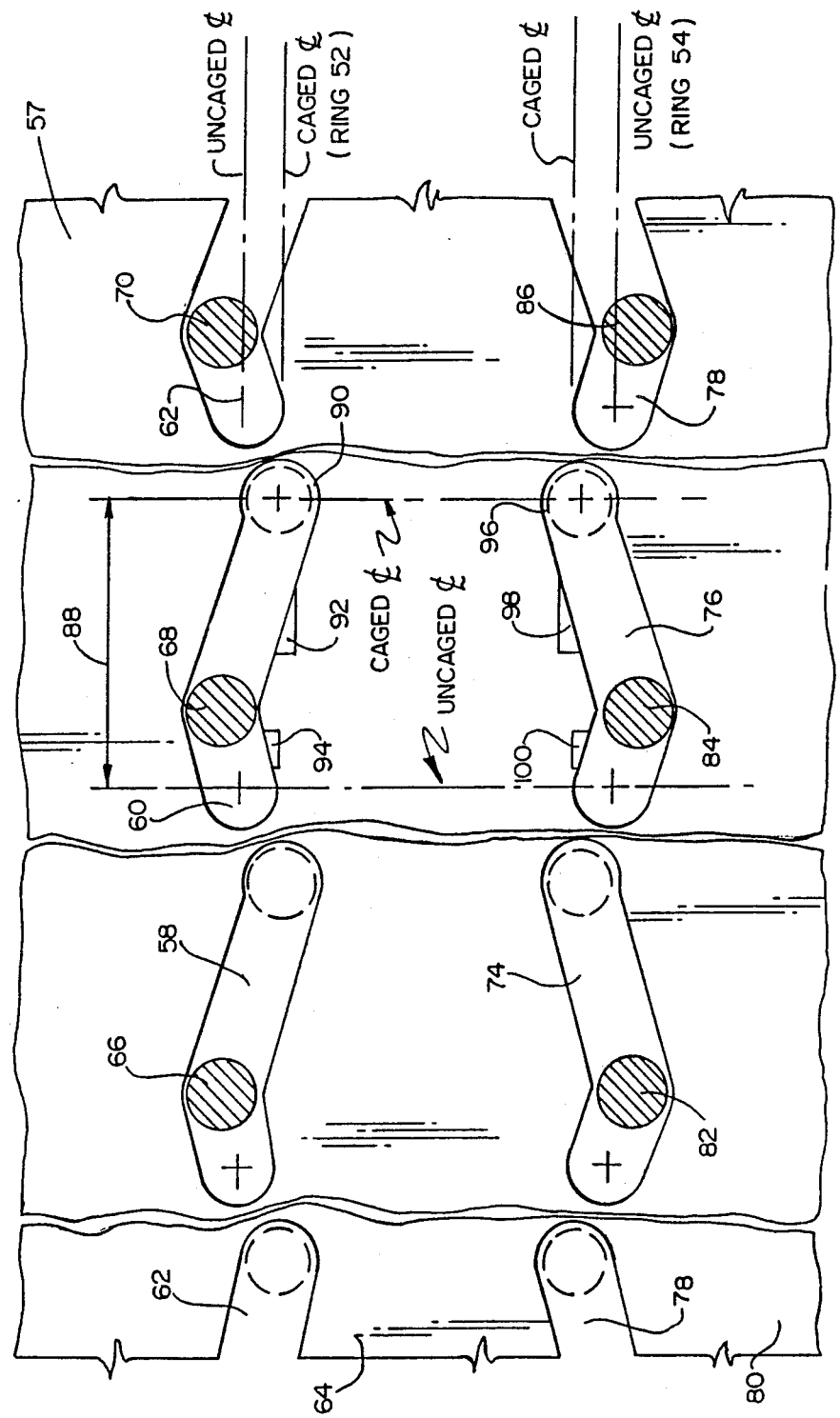
FIG. 6 is an exterior developed view of a cylindrical part which is shown in FIG. 4.

As shown in FIG. 6, which is an exterior developed view of cam 57, cam 57 has an upper cam portion 64, which has first, second and third groove surfaces 58, 60, 62, that respectively receive first, second and third upper cam followers 66, 68, 70. Cam 57 is rotatably movable about actuator axis 72. Rings 52, 54 and snubber 56 and cam 57 are coaxial along axis 72.

As shown in FIG. 6, cam 57 also has a lower cam portion 80, which has fourth, fifth and sixth lower groove surfaces 74, 76, 78, that respectively receive fourth, fifth and sixth lower cam followers 82, 84, 86.

As shown in FIG. 6, cam 57 has an angle of displacement 88. Upper groove surface 60 which is identical to upper groove surfaces 58, 62, has a level surface portion 90, a sloped surface portion 92, and a second sloped surface portion 94. The slopes used in surfaces 90, 92, 94 are discussed hereafter.

As shown in FIG. 6, lower groove surface 76 also has a level surface portion 96, a sloped surface portion 98, and another sloped surface portion 100. Surface portions 90, 96 act in the caged condition, for clamping rings 52, 54 on snubber 56. Cam 57 is angularly displaceable for angularly displacing grooves 60, 76. Surface portions 92, 98 and 94, 100 act to clamp or unclamp rings 52, 54.

As shown in FIG. 4, cam 57 has an upper roller bearing 102 and has a lower roller bearing 104. The outer race of upper bearing 102 is supported by housing 106. The inner race of upper bearing 102 supports cam 57.

Figure 7:
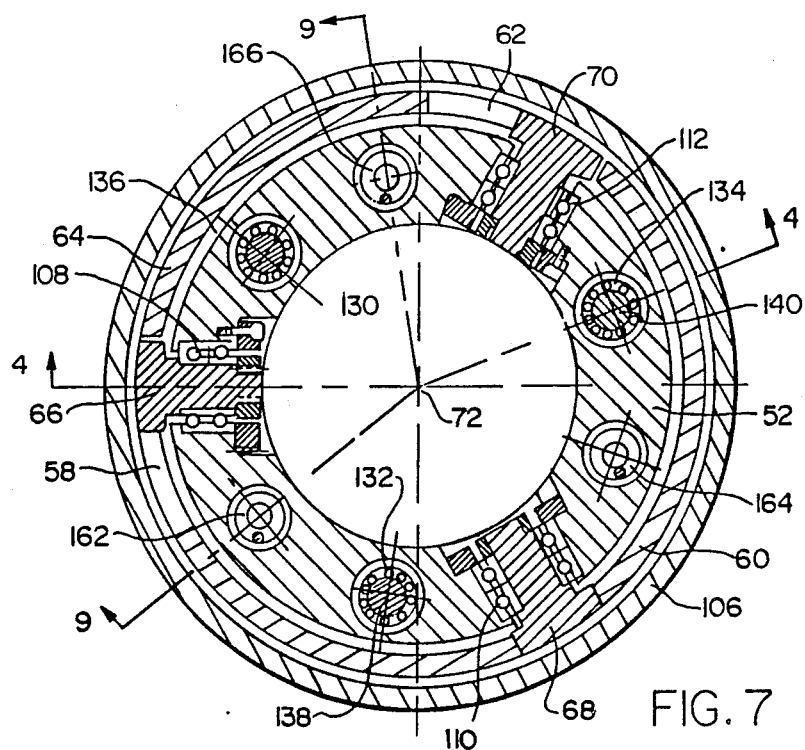
FIG. 7 is a section view as taken along line 7—7 of FIG. 4.

As shown in FIGS. 4 and 7, upper ring 52 has first, second and third bearings 108, 110, 112. Bearings 108, 110, 112 respectively support and receive cam followers 66, 68, 70.

Figure 8:
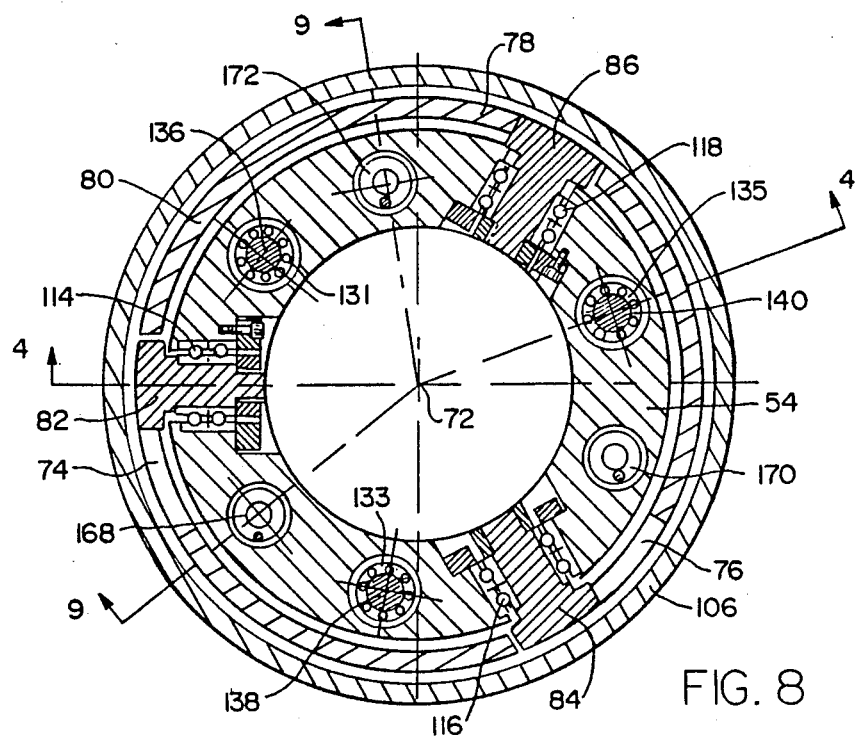
FIG. 8 is a section view as taken along line 8—8 of FIG. 4.

As shown in FIGS. 4 and 8, lower ring 54 has fourth, fifth and sixth bearings 114, 116, 118. Bearings 114, 116, 118 respectively support and receive cam followers 82, 84, 86.

As shown in FIG. 4, there is a separation space or annular gap 120 between surface 122 of ring 52 and surface 124 of snubber 56 in the uncaged condition. There is a similar space between surface 126 of lower ring 54 and surface 128 of snubber 56.

As shown in FIGS. 4 and 7, upper ring 52 has first, second and third upper bushing assemblies 130, 132, 134. Both rings 52, 54 have first, second and third guide assemblies 136, 138, 140 extending therethrough. Lower ring 54 has first, second and third lower bushing assemblies 131, 133, 135.

As shown in FIG. 4, housing 106 has a cap member 142, which supports the upper ends of guide assemblies 136, 138, 140. Housing 106 has a bracket 144 which supports the lower ends of guide assemblies 136, 138, 140. Housing 106 has a base 146 which supports bracket 144. Base 146 has a lock ring 148 and screws 150.

As shown in FIG. 4, a direct current motor having a stator 152 and a limited angle rotor 156 is provided. Stator 152 has leads 154. A lockring 158 positions rotor 156. Another lockring 160 positions stator 152.

Figure 9:
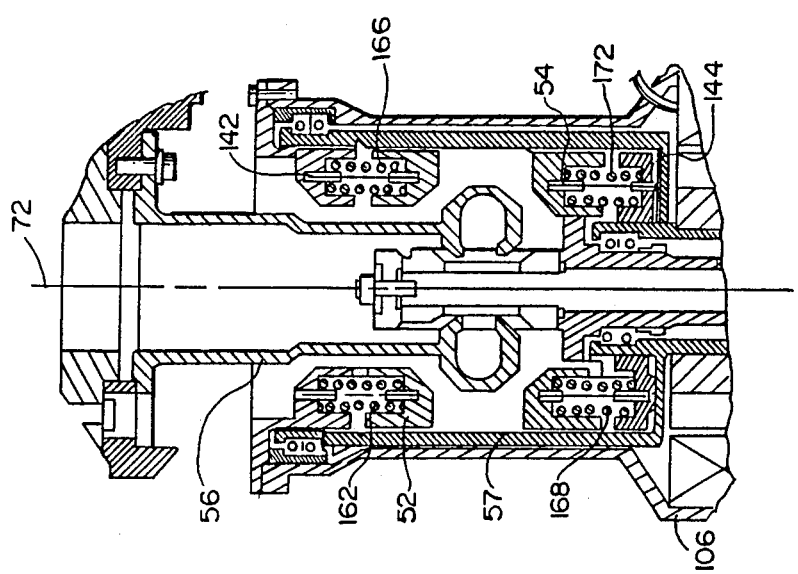
FIG. 9 is a section view as taken along line 9—9 of FIG. 7.

As shown in FIGS. 7, 8 and 9 three upper compression springs 162, 164, 166 are provided for urging upper ring 52 downwardly. Also, three lower compression springs 168, 170, 172 are provided for urging lower ring 54 upwardly.

Figure 10:
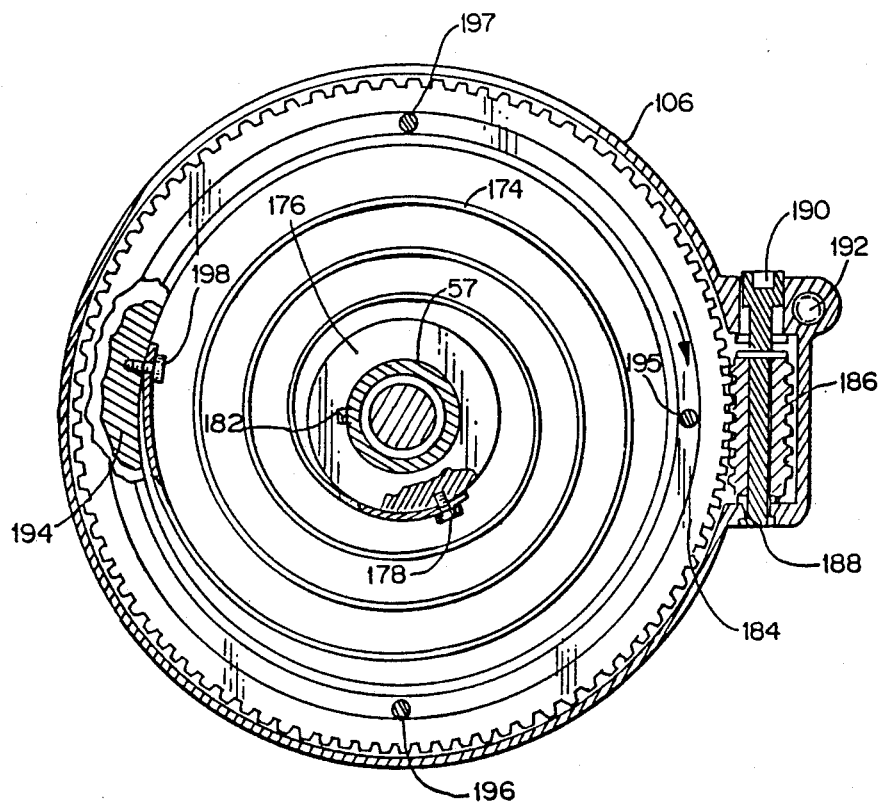
FIG. 10 is a section view as taken along line 10—10 of FIG. 4.

In FIGS. 4 and 10, a clockspring 174 is shown, which is located below the motor rotor 156 and motor stator 152. Clockspring 174 and compression springs 162, 164, 166 and 168, 170, 172 urge cam 57 towards its caged condition.

As shown in FIG. 10, clockspring 174 is connected at its inner end to a sleeve 176 by a screw 178. Sleeve 176 is connected to the lower tubular portion of cam 57 by a key 182. A lockring 180, as shown in FIG. 4, supports sleeve 176. Clockspring 174 at its outer end is connected to ring 194 by screw 198. Ring 194 connects to gear ring 184. Gear ring 184 meshes with a worm gear 186, which has a shaft 188. Shaft 188 has a cavity 190 for a screwdriver to adjust the tension in clockspring 174. A screw 192, which is transversely disposed relative to worm gear 186, is used to clamp worm gear 186 in a fixed position, as desired. Three screws 195, 196, 197 fixedly connect gear ring 184 to ring 194. A lockring 200, as shown in FIG. 4, supported by housing 106, is used to support ring 194.

Figure 12:
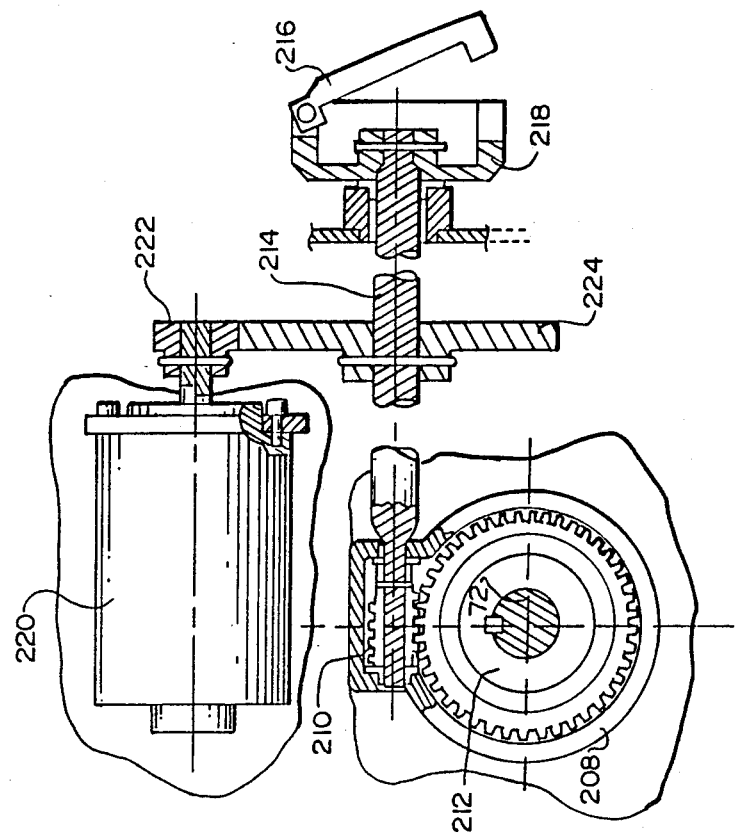
FIG. 12 is a section view as taken along line 12—12 of FIG. 11.
Figure 11:
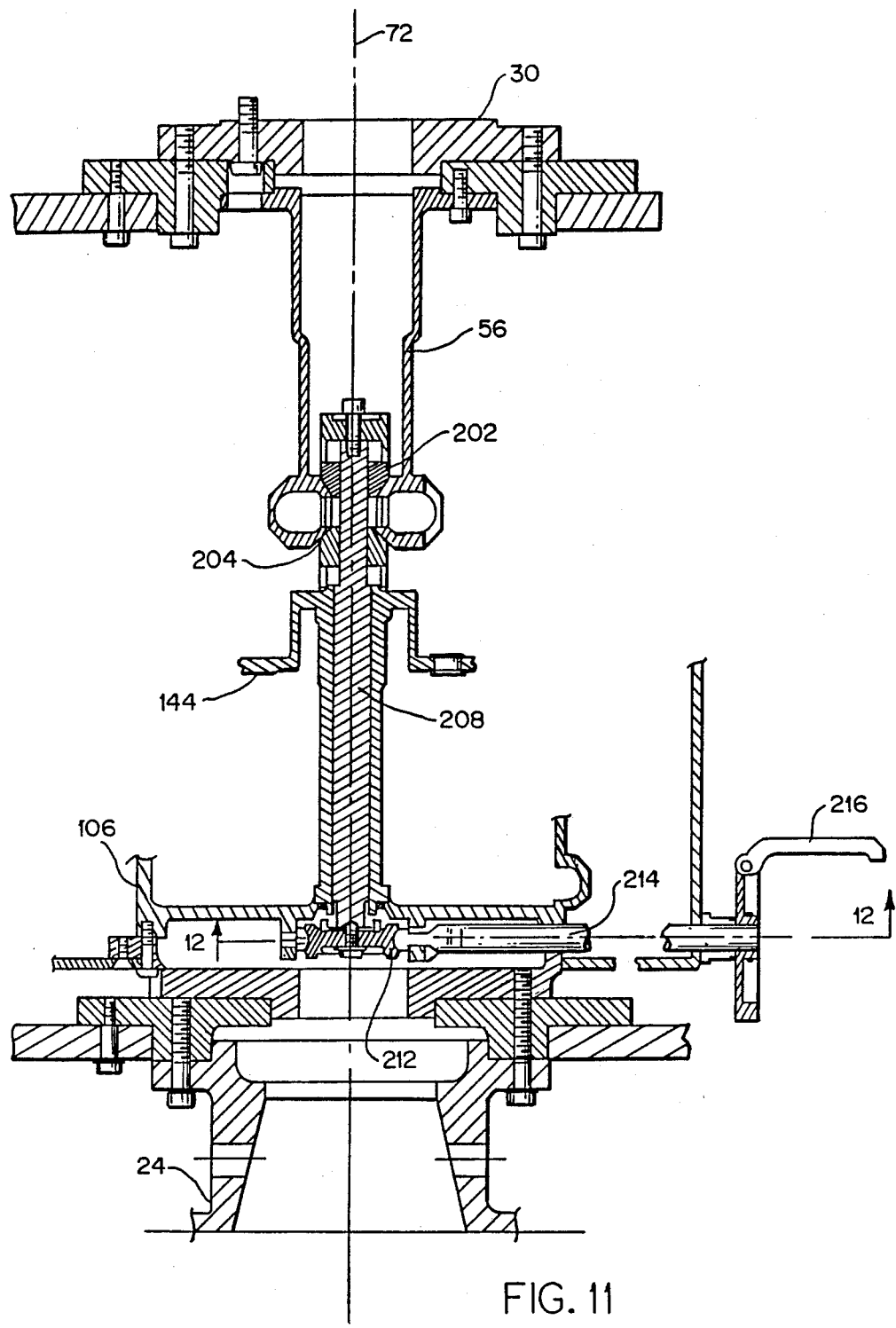
FIG. 11 is a section view corresponding to a portion of FIG. 4.

In FIG. 11, some parts are omitted for ease of illustration. As shown in FIG. 11, an auxiliary caging subassembly 201, which can be manually operated, is provided. Subassembly 201 includes an upper ring 202 and a lower ring 204, which clamp snubber 56 in a caged condition. A space 206, as shown in FIG. 4, separates upper ring 202 from snubber 56 in an uncaged condition. Upper ring 202 and lower ring 204 are supported by a shaft 208. Shaft 208 has external threads, and rings 202, 204 have meshing internal threads. Rotation in one direction of shaft 208 causes rings 202, 204 to move apart. Rotation in an opposite direction of shaft 208 causes rings 202, 204 to move towards each other. Shaft 208 is fixedly connected to a gear 212, which meshes with a worm gear 210, as shown in FIG. 12. Worm gear 210 has a drive shaft 214, which has a crank 218 with a crank handle 216. For electric drive, a motor 220 is also provided. Motor 220 has a pinion 222, which meshes with a gear 224, that is fixedly connected to shaft 214.

The operation of system 10 is discussed hereafter.

When platform 26 is in a caged condition, pointing system 14 can angularly accelerate payload 32 about axes 16, 18, 20. Platform 26 also provides vibration isolation for payload 32 in the uncaged condition.

Stator 152 and rotor 156 cause cam 57 to place and hold the rings 52, 54 and snubber 56 in an uncaged condition.

Compression springs 162, 164, 166, 168, 170, 172 and clockspring 174 cause cam 57 to place and hold rings 52, 54 and snubber 56 in a caged condition. Thus, if there is a loss of power, caging actuators 46, 48, 50 remain in a caged condition.

Clockspring 174 is also adjustable in tension, in order to control the caging time, and also to allow for wear or contamination in cam 57, rings 52, 54 and snubber 56.

Surfaces 90, 92, 94 of upper grooves 58, 60, 62, and opposite hand surfaces 96, 98, 100 of lower grooves 74, 76, 78 are selected, so that cam 57 operates in an optimum fashion. Level surfaces 90, 96 are in planes, which are normal to axis 72. Sloped surfaces 92, 98 are chosen to suit the torque of rotor 156 and stator 152, and to overcome the resisting torques caused by clockspring 174 and by compression springs 162, 164, 166, 168, 170, 172 and by friction. Sloped surfaces 94, 100 are opposite in slope to sloped surfaces 92, 98, so that compression spring torque changes its direction and clockspring torque remains in the same direction. Thus, more torque is required to initially move cam 57 out from its uncaged condition.

The advantages of system 10 are indicated hereafter.

1. In the uncaged condition, caging actuators 46, 48, 50 do not impart any friction to platform 26. Thus, payload unit 32 can float on a magnetic support without friction in the uncaged condition.

2 Caging actuators 46, 48, 50 lock payload unit 32 to pointing structure 14, if the power is shut off in an emergency situation.

3. An auxiliary caging system is provided which can be manually operated, or which can be electrically operated, in case of a breakdown of one or more of the caging actuators.

While the invention has been described in its preferred embodiments; it is to be understood that the words which have been used are words of description rather than limitation and that changes may be made within the purview of the appended claims without departing from the true scope and spirit of the invention in its broader aspects.

The embodiments of an invention in which an exclusive property or right is claimed and defined are as follows:

1. A caging system for a platform including at least one caging actuator comprising:
   a first ring having an axis;
   a second ring coaxial with the first ring;
   a snubber member disposed between the first ring and the second ring; and
   cam means for urging the first ring and the second ring against the snubber in a caged condition and for urging the first ring and the second ring away from the snubber in an uncaged condition.

2. The system of claim 1, wherein the cam means includes:
   a cylindrical cam member having first groove surfaces and having second groove surfaces axially spaced from the first groove surfaces;
   the first ring having first cam followers received by the first groove surfaces;
   the second ring having second cam followers received by the second groove surfaces;
   whereby the first ring and second ring are axially displaced to a caged position by rotation of the cylindrical cam member in one direction about the axis of the rings, and are axially displaced to an uncaged position by rotation of the cylindrical cam member in an opposite direction.

3. The system of claim 2, including:
   a first platform structure fixedly connected to the snubber member; and
   a second platform structure having means connecting to the first ring and the second ring.

4. The system of claim 3, including:
   a housing having a peripheral wall disposed coaxially with said first and second rings along said axis;
   an upper end wall connecting to said peripheral wall;
   a lower end wall axially spaced from the upper end wall and connecting to said peripheral wall and connecting to the second platform structure.

5. The system of claim 4, wherein
   said first and second rings have at least one elongate guide assembly for guiding the first and second rings along said axis.

6. The system of claim 5, wherein
   said cylindrical cam member has a motor for angularly displacing the cylindrical cam member for urging the first ring away from the second ring to an uncaged condition.

7. The system of claim 6, wherein
   said cylindrical cam member has a spring means for urging the first ring toward the second ring to a caged condition.

8. The system of claim 7, wherein the spring means includes a clockspring having a first end portion connected to the cylindrical cam member and having a second end portion connected to the housing.

9. The system of claim 8, wherein the spring means includes a ring gear fixedly connected to the second end portion of the clockspring and includes a worm gear mounted on the housing and in mesh with the ring gear for adjusting the tension in the clockspring.

10. The system of claim 1, including a second caging actuator disposed coaxially with said caging actuator and comprising:
    a third ring disposed radially inwardly of the first ring coaxially therewith;
    a fourth ring disposed radially inwardly of the second ring coaxially therewith;
    said snubber member having an annular portion enclosing a central opening which receives the third ring and the fourth ring;
    said third and fourth rings having respective internal threads;
    an axial shaft extending through the opening and having external threads in mesh with the respective internal threads; and
    drive means for turning the axial shaft.

11. The system of claim 10, wherein the drive means includes gear means for manually turning the axial shaft.

12. The system of claim 11, wherein the drive means also includes a second motor for electrically turning the axial shaft.

13. The system of claim 2, wherein the first groove surfaces have respective upper level surface portions and wherein the second groove surfaces have respective lower level surface portions, said upper level surface portions being disposed in an upper plane which is normal to the axis, said lower level surface portions being disposed in a lower plane which is normal to the axis, so that a force transmitted along the axis and passing through the cam followers and rings does not tend to rotate the cam member, whereby the first ring and the second ring are locked together while in the caged position.

14. The system of claim 13, wherein a payload is fixedly connected to the snubber member and wherein a spacecraft is fixedly connected to the first ring and the second ring, whereby the payload is locked to the spacecraft in the caged position.

* * * * *